(12) United States Patent
Liu et al.

(10) Patent No.: US 12,278,515 B2
(45) Date of Patent: *Apr. 15, 2025

(54) METHOD FOR BATTERY CHARGING MANAGEMENT, TERMINAL DEVICE, AND STORAGE MEDIUM

(71) Applicant: PAX COMPUTER TECHNOLOGY (SHENZHEN) CO., LTD., Guangdong (CN)

(72) Inventors: Chuan Liu, Guangdong (CN); Mengying Zhang, Guangdong (CN)

(73) Assignee: PAX COMPUTER TECHNOLOGY (SHENZHEN) CO., LTD., Guangdong (CN)

( * ) Notice: Subject to any disclaimer, the term of this patent is extended or adjusted under 35 U.S.C. 154(b) by 565 days.

This patent is subject to a terminal disclaimer.

(21) Appl. No.: 17/627,533

(22) PCT Filed: Jul. 6, 2020

(86) PCT No.: PCT/CN2020/100427
§ 371 (c)(1),
(2) Date: Jan. 14, 2022

(87) PCT Pub. No.: WO2021/008403
PCT Pub. Date: Jan. 21, 2021

(65) Prior Publication Data
US 2022/0376541 A1    Nov. 24, 2022

(30) Foreign Application Priority Data
Jul. 15, 2019  (CN) .......................... 201910637060.7

(51) Int. Cl.
*H02J 7/00*   (2006.01)
*H01M 10/44*  (2006.01)

(52) U.S. Cl.
CPC ..... *H02J 7/007188* (2020.01); *H01M 10/446* (2013.01); *H01M 2220/30* (2013.01)

(58) Field of Classification Search
CPC .......... H02J 7/0048; H02J 7/35; H02J 7/0068; H02J 9/061; H02J 3/38; H02J 7/0013;
(Continued)

(56) References Cited

U.S. PATENT DOCUMENTS 9,342,127 B2    5/2016  Ishidera
9,664,746 B2 *  5/2017  Glover ............... G01R 31/3646
(Continued)

FOREIGN PATENT DOCUMENTS

CN    101350436 A    1/2009
CN    102866759 A    1/2013
(Continued)

OTHER PUBLICATIONS

Englsh Translation of International Search Report for International Application No. PCT/CN2020/100427; Date of Completion: Aug. 7, 2020; Date of Mailing: Oct. 9, 2020; 2 Pages.
(Continued)

*Primary Examiner* — Binh C Tat
(74) *Attorney, Agent, or Firm* — Meunier Carlin & Curfman LLC

(57) ABSTRACT

The present application provides a method for battery charge management, which includes: acquiring current time and historical power supply data when a preset condition for switching a charge mode of a battery is met; determining a corresponding predicted charge mode according to the historical power supply data; and updating a current charge mode of the terminal according to the predicted charge mode. The method for battery charge management can reasonably predict the power supply situation of the terminal
(Continued)

at the current time based on the historical power supply data that can characterize usage habits of a user.

13 Claims, 2 Drawing Sheets

(58) Field of Classification Search
CPC .. H02J 7/00; H02J 7/00036; H02J 3/00; H02J 3/007; H02J 2300/22; H02J 3/388; H02J 7/00045; H02J 2300/00; H02J 7/04; H02J 7/00047; H02J 7/0071; H02J 7/005; H02J 50/10; H02J 7/007; H02J 7/0025; H02J 7/0045; H02J 3/381; H02J 7/0014; H02J 3/322; H02J 7/0047; H02J 7/342; H02J 13/00002; H02J 2310/48; H02J 7/0063; H02J 2300/10; H02J 50/80; H02J 50/90; H02J 7/007182; H02J 13/00028; H02J 2300/24; H02J 2310/44; H02J 7/0016; H02J 7/34; H02J 13/00007; H02J 3/008; H02J 7/00714; H02J 7/02; H02J 2310/12; H02J 7/0031; H02J 11/00; H02J 4/00; H02J 7/00034; H02J 7/0024; H02J 7/00302; H02J 7/1423; H02J 3/14; H02J 7/00712; H02J 7/0029; H02J 7/0049; H02J 7/345; H02J 13/00004; H02J 13/00036; H02J 3/32; H02J 7/0069; H02J 7/007188; H02J 7/14; H02J 13/00034; H02J 13/0005; H02J 2207/20; H02J 2300/28; H02J 2310/22; H02J 2310/64; H02J 3/0012; H02J 50/30; H02J 7/00308; H02J 7/00711; H02J 7/007192; H02J 9/062; H02J 15/00; H02J 2207/40; H02J 2300/26; H02J 2310/60; H02J 3/004; H02J 3/04; H02J 3/40; H02J 3/46; H02J 7/00041; H02J 7/0019; H02J 7/00304; H02J 7/0042; H02J 7/00716; H02J 7/007184; H02J 7/06; H02J 9/06; H02J 13/00001; H02J 2207/30; H02J 2300/30; H02J 2310/14; H02J 2310/66; H02J 3/001; H02J 3/0075; H02J 3/466; H02J 50/05; H02J 7/00032; H02J 7/00038; H02J 7/00306; H02J 7/00309; H02J 7/0044; H02J 7/007194; H02J 9/005; H02J 9/068; H01M 10/441; H01M 10/482; H01M 2010/4271; H01M 2220/30; H01M 2220/20; H01M 50/249; H01M 10/4257; H01M 10/613; H01M 10/6235; H01M 10/44
USPC .................................................. 320/155–159
See application file for complete search history.

(56) References Cited

U.S. PATENT DOCUMENTS

| | | | | |
|---|---|---|---|---|
| 2018/0269685 | A1* | 9/2018 | Sugeno | H02S 40/32 |
| 2019/0199105 | A1* | 6/2019 | Hofer | G06F 1/32 |

FOREIGN PATENT DOCUMENTS

| | | |
|---|---|---|
| CN | 103023075 A | 4/2013 |
| CN | 103296703 A | 9/2013 |
| CN | 106786997 A | 5/2017 |
| CN | 108357382 A | 8/2018 |
| CN | 110429672 A | 11/2019 |
| EP | 2458704 A1 | 5/2012 |
| JP | 2012228005 A | 11/2012 |

OTHER PUBLICATIONS

International Search Report for International Application No. PCT/CN2020/100427; Date of Completion: Aug. 7, 2020; Date of Mailing: Oct. 9, 2020; 3 Pages.
Written Opinion for International Application No. PCT/CN2020/100427; International Filing Date: Jul. 6, 2020; Date of Mailing: Oct. 9, 2020; 4 Pages.

* cited by examiner

METHOD FOR BATTERY CHARGING MANAGEMENT, TERMINAL DEVICE, AND STORAGE MEDIUM

CROSS-REFERENCE TO RELATED APPLICATIONS

This application is a National Stage Appl. filed under 35 USC 371 of International Patent Application No. PCT/CN2020/100427 with an international filing date of Jul. 6, 2020, designating the United States, now pending, which claims the priority of the Chinese Patent Application No. 201910637060.7 filed on Jul. 15, 2019. The contents each of which are incorporated herein by reference.

TECHNICAL FIELD

The present application relates to the field of battery charge and discharge management technologies, and more particularly, to a method for battery charge management, a terminal device and a storage medium.

BACKGROUND

With rapid development of embedded technology, more and more terminal devices loaded with lithium batteries have been used in various industries, such as point of sale (POS) terminals and mobile phones. Improper use of lithium batteries will damage the lithium batteries and even cause risk of use. For example, the lithium battery may be exploded when power of the lithium battery is at high energy for a long time, or the lithium battery continues to be used after being over-discharged, or the lithium battery is charged and discharged too frequently, or the lithium battery is over-charged. These improper uses of lithium batteries are usually related to poor usage habits of users, such as, long-term low-power storage or long-term charging of lithium batteries. Existing lithium battery charge management technologies cannot avoid damage to the lithium battery caused by improper usage habits of the users.

Technical Problem

In view of this, embodiments of the present application provide a method for battery charge management, a terminal device, and a storage medium, aiming to solve the problem that the existing battery charge management technologies cannot avoid battery damage caused by different usage habits of the users.

Technical Solutions

In accordance with a first aspect of the embodiments of the present application, it is provided a method for battery charge management, including: acquiring current time and historical power supply data when a preset condition for switching a charge mode of a battery is met; determining a corresponding predicted charge mode according to the historical power supply data; and updating a current charge mode of a terminal according to the predicted charge mode. The historical power supply data includes actual power supply information of the terminal loaded with the battery within a time period determined by the current time.

The method for battery charge management in accordance with the embodiments of the present application can reasonably predict a power supply situation of the terminal at the current time based on the historical power supply data that can characterize usage habits of the user, so as to acquire the predicted charge mode and update the current charge mode of the terminal to be the predicted charge mode, thereby reducing battery failure or risk caused by improper operations of the user, and solving the problem that the existing battery charge management technologies cannot avoid battery damage caused by improper operations of the user.

With reference to the first aspect, in some embodiments of the present application, the acquiring current time and historical power supply data includes: acquiring current time, and determining a corresponding time period according to the current time; and collecting and counting the number of times the terminal is powered in a first power supply type during the time period, and the number of times the terminal is powered in a second power supply type during the time period.

The method for battery charge management in accordance with the embodiments of the present application determines the time period corresponding to the historical power supply data that needs to be collected through the current time, and then collects the more specific and representative historical power supply data, thereby improving a reliability of the charge mode prediction. In the method for battery charge management in accordance with the embodiment of the present application, the number of times the terminal is powered in the first power supply type and the number of times the terminal is powered in the second power supply type within a time period are respectively collected, so that the subsequent steps can directly use the above-mentioned specific historical power supply data to make a reasonable prediction of the power supply situation of the terminal at the current time, thereby improving the reliability of the prediction.

With reference to the first aspect, in some embodiments of the present application, the predicted charge mode includes a first charge model and a second charge model; a fully-charged capacity of the first charge model is smaller than a fully-charged capacity of the second charge model, and/or a recharged capacity of the first charge model is smaller than a recharged capacity of the second charge model; accordingly, the determining a corresponding predicted charge mode according to the historical power supply data includes: determining that the first charge model is the corresponding predicted charge mode, when the number of times of the first power supply type is greater than the number of times of the second power supply type in the historical power supply data.

The method for battery charge management in accordance with the embodiments of the present application acquires the predicted charge mode by comparing the historical power supply data. If there are more non-battery power supply conditions than the battery-powered conditions, a charge mode having a smaller fully-charged and/or recharged capacity is selected as the predicted charge mode, so as to adapt to the user's continued use of non-battery power supply for the terminal, thereby protecting the battery and avoiding an over-charge fault of the battery.

With reference to the first aspect, in some embodiments of the present application, the determining a corresponding predicted charge mode according to the historical power supply data further includes: determining that the second charge model is the corresponding predicted charge mode, when the number of times of the first power supply type is smaller than or equal to the second power supply type in the historical power supply data The method for battery charge management in accordance with the embodiments of the present application acquires the predicted charge mode by comparing the historical power supply data. If there are more battery-powered conditions than non-battery-powered conditions, a charge mode having a larger fully-charged capacity and/or recharged capacity is selected as the predicted charge mode, so as to adapt to the user's continued use of battery power supply for the terminal, thereby protecting the battery and avoiding an over-discharge fault of the battery.

With reference to the first aspect, in some embodiments of the present application, after the current time and the historical power supply data are acquired, and before the corresponding predicted charge mode is determined according to the historical power supply data, the method for battery charge management also includes: judging whether a data amount of the historical power supply data is greater than or equal to a preset data amount threshold; and determining the corresponding predicted charge mode according to the historical power supply data, when the data amount of the historical power supply data is greater than or equal to the preset data amount threshold.

The method for battery charge management in accordance with the embodiment of the present application evaluates the accuracy and reliability of the prediction by detecting the data amount of the historical power supply data before using the historical power supply data to predict the power supply of the terminal. Only when the historical power supply data has a large amount of data, will the historical power supply data be configured to predict the power supply of the terminal, thereby improving the accuracy and reliability of the predicted charge mode, and the safety of the battery is thus ensured.

With reference to the first aspect, in some embodiments of the present application, the method for battery charge management also includes: updating the current charge mode of the terminal according to a preset default charge mode when the data amount of the historical power supply data is smaller than the preset data amount threshold.

The method for battery charge management in accordance with the embodiments of the present application evaluates the accuracy and reliability of the prediction by detecting the data amount of the historical power supply data before using the historical power supply data to predict the power supply of the terminal. When the data amount of historical power supply data is small, the historical power supply data having small data amount is discarded to avoid improper prediction of the power supply and charging conditions of the terminal, thereby protecting the battery and avoiding the over-charge or over-discharge faults of the battery.

With reference to the first aspect, in some embodiments of the present application, before the current time and the historical power supply data are acquired, the method for battery charge management also includes: setting a current charge mode of the terminal according to a designated charge mode in a battery charge mode instruction, when the battery charge mode instruction is received.

The method for battery charge management in accordance with the embodiments of the present application can freely set the current charge mode of the terminal according to specific usage scenarios of the user and the actual power supply situation of the terminal, which is beneficial to improve the use flexibility of the method for battery charge management in accordance with the embodiments of the present application, provides good consideration to the characteristics of high battery life and high safety, and expands application scenarios.

In accordance with a second aspect of the embodiments of the present application, it is provided a terminal device, including: a data acquisition unit, a mode prediction unit, and a mode update unit. The data acquisition unit is configured to acquire current time and historical power supply data, when a preset condition for switching a charge mode of a battery is met. The historical power supply data includes actual power supply information of a terminal loaded with the battery within the time period determined according to the current time. The mode prediction unit is configured to determine a corresponding predicted charge mode according to the historical power supply data. The mode update unit is configured to update a current charge mode of the terminal according to the predicted charge mode.

In accordance with a third aspect of the embodiments of the present application, it is provided a terminal device, including a memory, a processor, and a computer program stored in the memory and running on the processor, and when the computer program is executed by the processor, steps of the method described in the first aspect or any one of the first aspects are implemented.

In accordance with a fourth aspect of the embodiments of the present application, it is provided a computer-readable storage medium. The computer-readable storage medium stores a computer program, and when the computer program is executed by a processor, steps of the method described in the first aspect or any one of the first aspects are implemented.

BRIEF DESCRIPTION OF THE DRAWINGS

In order to illustrate technical solutions in the embodiments of the present application more clearly, the following will briefly introduce the drawings needed in the description of the embodiments or the existing technologies. Obviously, the drawings in the following description are merely some embodiments of the present application. For those of ordinary skill in the art, other drawings can be obtained based on these drawings on the premise of paying no creative labor.

DETAILED DESCRIPTION OF THE EMBODIMENTS

In the following description, for the purpose of illustration rather than limitation, specific details such as a specific system structure and technology are presented to provide a thorough understanding of the embodiments of the present application. However, it should be clear to those skilled in the art that the present application can also be implemented in other embodiments without these specific details. In other cases, detailed descriptions of well-known systems, devices, circuits, and methods are omitted to avoid unnecessary details from obstructing the description of the present application.

In order to illustrate the technical solutions of the present application, specific embodiments are presented below.

Figure 1:
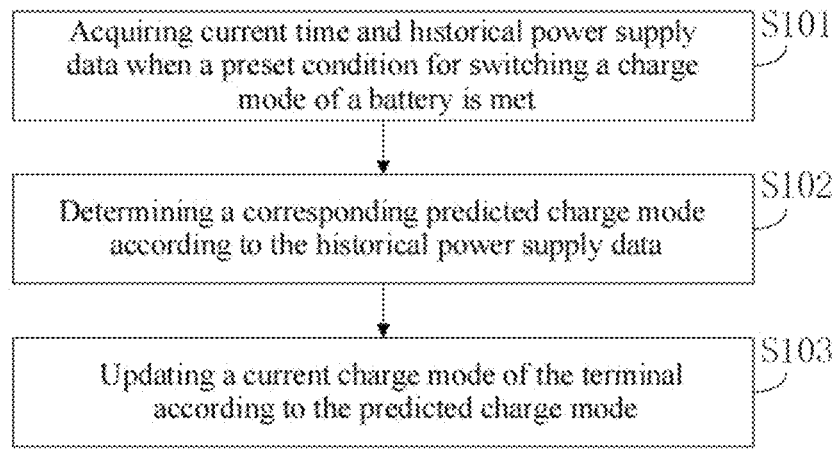
FIG. 1 is a schematic diagram of an implementation process of a specific example of a method for battery charge management in accordance with an embodiment of the present application.

An embodiment of the present application provides a method for battery charge management. As shown in FIG. 1, the method for battery charge management may include the following steps.

Step S101: acquiring current time and historical power supply data, when a preset condition for switching a charge mode of a battery is met, In a specific embodiment, the condition for switching the charge mode of the battery can be set by a user. For example, the user may set the charge mode of the battery to be switched at a regular interval, such as 30 minutes. In order to perform reasonable switching control on the charge mode of the battery, usage habits of the user may be analyzed through the historical power supply data, so as to predict the user's operation on powering the terminal.

According to a sampling period, the historical power supply data is the data collected from the beginning of sampling to the current time. In order to predict the future power supply situation of the terminal with higher accuracy, the historical power supply data collected should have higher reliability, thereby improving the accuracy and reliability of the charge mode prediction through the historical power supply data in subsequent steps. Specifically, the collected historical power supply data may be actual power supply information of the terminal loaded with the battery in a time period determined according to the current time.

Figure 2:
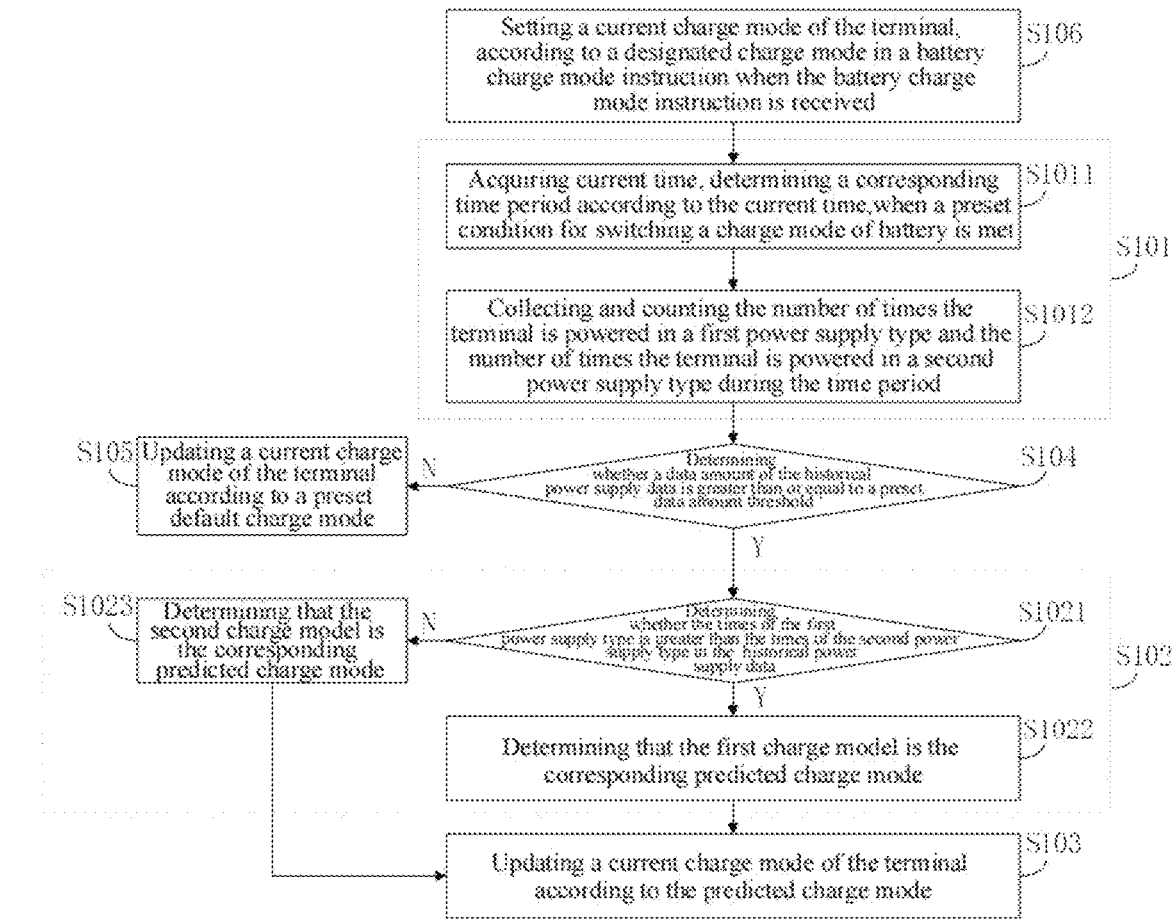
FIG. 2 is a schematic diagram of an implementation process of another specific example of a method for battery charge management in accordance with an embodiment of the present application.

In practical applications, as shown in FIG. 2, a process of acquiring the current time and the historical power supply data in step S101 can be implemented through the following sub-steps.

Step S1011: acquiring current time, and determining a corresponding time period according to the current time.

Specifically, the time period corresponding to the current time may be a time period of [T, T+n]. In which, T represents the current time; n is an integer parameter related to a battery life of the terminal, and the value of n is proportional to the battery life of the terminal, which may be set as half of the battery life of the terminal. If the current time is exactly on the hour, then the current time can be directly used as T; if the current time is not on the hour, then the following hour on the hour is used as T.

As an example, if the current time is 13:45 and the battery life of the terminal is 10 hours, then the corresponding time period is [14, 19], that is, a time period between 14:00 and 19:00.

Step S1012: collecting and counting the number of times the terminal is powered in a first power supply type during the time period and the number of times the terminal is powered in a second power supply type during the time period.

In order to improve the accuracy of predicting the future power supply situation of the terminal, it is necessary to enrich the historical power supply data to ensure the reliability of the historical power supply data. The historical power supply data of the previous multiple days in this time period may be collected, for example, the historical power supply data of the last seven days in the same time period may be collected. The number of days to be collected can also be freely selected by the user according to needs, which is not limited in the embodiment of the present application.

In practical applications, a situation where the terminal is powered in non-battery power supply may be set as the first power supply type, and a situation where the terminal is powered in battery power supply may be set as the second power supply type. Correspondingly, in the historical power supply data, identification points may be provided for marking the specific power supply type of the terminal at the corresponding moment. A first identification point may be used to indicate that the terminal is powered in the non-battery power supply at the corresponding moment, which is corresponding to the first power supply type, and a second identification point may be used to indicate that the terminal is powered in the battery power supply at the corresponding moment, which is corresponding to the second power supply type. In the historical power supply data, the first identification point and the second identification point may be included, such that the method for battery charge management in accordance with the embodiment of the present application can achieve statistics on the number of times the terminal is powered in the first power supply type or the first power supply type by separately count the number of the first identification point and the second identification point in the historical power supply data.

It should be noted that, in the method for battery charge management provided by the embodiment of the present application, the non-battery power supply situation corresponding to the first power supply type and the first identification point include power supply from a power adapter and power supply from a charger base. In the embodiment of the present application, there is no need to further distinguish the types of non-battery power supply, when collecting the historical power supply information.

In addition, relevant parameters can be set by the user as needed to collect historical power supply data. For example, the user can specify that power supply information of the terminal is collected periodically at an interval of 10 seconds. When the power supply information of the terminal collected at a certain moment is the non-battery power supply, this moment is marked as the first identification point; when the power supply information collected at a certain moment of the terminal is the battery power supply, this moment is marked as the second identification point.

Since the storage capacity of the terminal or the background server in communication with the terminal is limited, in practical applications, it is also necessary to manage and control the storage of historical power supply data. For example, it is specified that the historical power supply data is collected and stored every 10 seconds, and the stored historical power supply data is cleared every 24 hours. It is possible to clear the data several days ago, such as deleting the data seven days ago. In order to avoid excessive redundancy of data records in database and to avoid operating the database too frequently, the aforementioned time or time interval is set, but the embodiment of the present application does not limit the specific value of the aforementioned time or time interval.

In addition to the first identification point and the second identification point, a first duration and a second duration may also be used as historical power supply data. Specifically, the step S1012 can be replaced by collecting a first duration when the terminal is powered in non-battery power supply during a time period and a second duration when the terminal is powered in battery power supply during the time period.

Step S102: determining a corresponding predicted charge mode according to the historical power supply data.

Specifically, the predicted charge mode may include a first charge model and a second charge model. Among them, the first charge model and the second charge model are charge models having different fully-charged capacity and recharged capacity, respectively. Through the first charge model and the second charge model, battery charge control can be performed on the terminal in different usage scenarios. In an example, the fully-charged capacity of the first charge model is smaller than the fully-charged capacity of the second charge model, and the recharged capacity of the first charge model is smaller than the recharged capacity of the second charge model. Table 1 shows the specific parameters of the first charge model and the second charge model presented in the embodiment of the present application.

TABLE 1

| charge | Parameter | |
| --- | --- | --- |
| Model | fully-charged capacity | recharged capacity |
| First charge model | 80% | 65% |
| Second charge model | 100% | 85% |

In case that the terminal is plugged in with external power for a long time, the first charge model is selected, that is, the terminal is preferentially powered by the power supply, and when the instantaneous voltage or current of the power supply is insufficient, the terminal will also draw power from the battery. In case that the terminal is occasionally plugged in with external power (less times, short time) or is not plugged in with external power, the second charge model is selected, that is, the terminal is powered mainly by the battery, in this case, the external power may be chose to use according to whether the terminal is equipped with external power. In case that the second charge model is selected and the terminal is connected to an external power source, and the instantaneous voltage or current of the battery is insufficient, the terminal will also draw power from the power source.

The fully-charged capacity means that the charging of battery is stopped when the battery is charged to a certain level. Since the battery has self-discharge, and some wireless modules that consume more power may have high peak currents, where power from the power adapter is not enough to meet high peak currents of the wireless modules, to draw power from the battery is still needed, such that even if the power adapter is kept on, and the charging of battery is stopped after being charged to the certain level, power in the battery will still gradually decrease, when the battery power is decreased to a certain level, that is, when the battery power drops to the recharged capacity, the battery will be recharged. The recharged capacity indicates that the battery needs to be recharged after being discharged to a certain level.

The peak current of the wireless module occurs when the module registers with the base station to the network. For example, the terminal may reach the peak current of 5V2A at the beginning, and only 5V600 mA is needed for the subsequent normal operation. In order to save costs, the power adapter generally provides only a power supply capability of 5V1A, because the higher the power supply capability, the higher the price of the power adapter. In specific application scenarios, in case that the power adapter is insufficient to meet the power consumption of the terminal, the terminal will draw power from the battery. In case that the power supply capacity of the power adapter exceeds the power consumption of the terminal, the battery will be charged.

Based on the historical power supply data, it is possible to predict the usage habits of the user, and then select an appropriate charge mode for the terminal according to the usage habits of the user, that is, to select the predicted charge mode of the terminal.

In a specific implementation, as shown in FIG. 2, the process of step S102 can be implemented through the following sub-steps.

Step S1021: determining whether the number of times of the first power supply type is greater than the number of times of the second power supply type in the historical power supply data. In case that the number of times of the first power supply type is greater than the number of times of the second power supply type in the historical power supply data, step S1022 is performed. In case that the number of times of the first power supply type is smaller than or equal to the number of times of the second power supply type in the historical power supply data, step S1023 is performed.

Step S1022: determining that the first charge model is the corresponding predicted charge mode.

Step S1023: determining that the second charge model is the corresponding predicted charge mode.

When the first duration and the second duration are used instead of the first identification point and the second identification point as the historical power supply data, the corresponding step S1021 can be replaced with: judging whether the first duration is greater than the second duration. In case that the first duration is greater than the second duration, the step S1022 is performed; when the first duration is smaller than or equal to the second duration, the step S1023 is performed.

Step S103: updating a current charge mode of the terminal according to the predicted charge mode.

Optionally, as shown in FIG. 2, in order to ensure accurate prediction of the usage habits of the user, the following steps may further be performed after the above step S101 and before the step S102.

Step S104: determining whether the data amount of the historical power supply data is greater than or equal to a preset data amount threshold. In practical applications, when collecting historical power supply data, due to abnormal conditions such as terminal power failures, equipment failures, etc., data loss, storage errors, etc. may occur. Therefore, it is necessary to set a data amount threshold and a compare processes in step S104. The data amount threshold can be set as the maximum data amount of historical power supply data in a specific time period of the day. For example, the historical power supply data is set to be collected every 10 seconds, the battery life of the terminal is 10 hours. According to the correlation between the battery life of the terminal and the sampling time, the sampling time may be selected as 5 hours, and then the data amount threshold may be 6×60×5=1800, which means that 6 data points are collected every minute for a total of 5 hours, which corresponds to the maximum amount of data.

In case that the data amount of the historical power supply data is greater than or equal to the preset data amount threshold, step S102 is performed; and in case that the data amount of the historical power supply data is smaller than the preset data amount threshold, step S105 is performed.

Step S105: updating a current charge mode of the terminal according to a preset default charge mode. In the case that the data amount of the historical power supply data is insufficient, if the historical power supply data having a small amount of data is still used to predict the usage habits of the user and the charge mode of the terminal, a large error may be presented. Therefore, in the embodiment of the present application, no prediction is performed on the charge mode when the data amount of historical power supply data is insufficient, instead, the default charge mode is directly selected, thereby providing more reliable control of the terminal and the battery.

In practical applications, since the second charge model has better battery life, the second charge model may be selected as the default charge mode.

Optionally, as shown in FIG. 2, in order to further enhance use flexibility of the method for battery charge management provided by the embodiment of the present application, the following steps may further be performed before the step S101.

Step S106: setting a current charge mode of the terminal, according to a designated charge mode in a battery charge mode instruction, when the battery charge mode instruction is received.

The user can directly specify to use the first charge model or the second charge model. In this case, the current charge mode of the terminal can be directly set as the designated charge mode specified by the user.

Taking POS as an example, application scenarios for POS terminals may be provided with multiple types, such as the "POS+vending machine" scenario. In this scenario, the POS terminal is always plugged in with external power, and the charge mode of the POS terminal may be set to the first charge model. While the POS terminal for the courier who works in a mobile office needs to work on battery power after the POS terminal is fully charged, and the charge mode thereof may be set to the second charge model. If the application scenario is not clear, the charge mode of the battery can be predicted and set through the method for battery charge control in accordance with the embodiments of the present application Specifically, for the applications written according to the method for battery charge control provided by the embodiments of the present application, a working mode can be actively set through a registry key "persist.sys.battery.type" In which, the persist.sys.battery.type=0, indicating that the working mode is automatically recognized by the terminal, that is, the charge mode of the battery is predicted and set through the method for battery charge control provided by the embodiments of the present application; the persist.sys.battery.type=1, indicating that the working mode is set to the second charge model; and the persist.sys.battery.type=2, indicating that the working mode is set to the first charge model.

In the above application, A thread and B thread may be provided. In which, the thread A is responsible for using the database to record the type and time of power supply within a week, being collected every 10 seconds. In order to avoid excessive database sizes caused by long-time startup, the terminal cleans up data every 24 hours, deleting the data 7 days ago. Thread B is configured for dynamically switching the charge mode of the battery, querying the current time every 30 minutes and retrieving the historical power supply data. Thread B is also configured to control a battery charge of the terminal according to the historical power supply data through the method for battery charge control provided by the embodiments of the present application.

The method for battery charge management in accordance with the embodiments of the present application performs a reasonable prediction on the power supply situation of the terminal at the current time based on the historical power supply data that can represent the usage habits of the user, thereby acquiring a predicted charge mode, and updating the current charge mode of the terminal to be the predict charge mode, so that the battery failure or risk caused by the improper usage habits of the user is reduced, solving the problem that the existing battery charge management technologies cannot avoid the battery damage caused by improper operations of the user.

It should be understood that the sequence number of each step in the foregoing embodiment does not mean the order of execution. The execution sequence of each process should be determined by the function and internal logic, and should not constitute any limitations on the implementation process of the embodiments of the present application.

Figure 3:
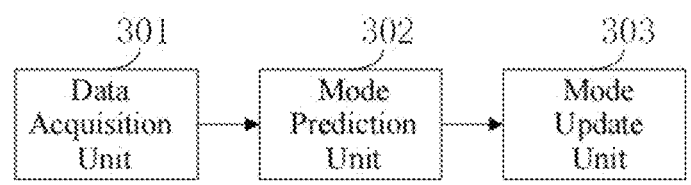
FIG. 3 is a schematic structural diagram of a specific example of a terminal device in accordance with an embodiment of the present application.

The embodiment of the present application also provides a terminal device. As shown in FIG. 3, the terminal device may include: a data acquisition unit 301, a mode prediction unit 302, and a mode update unit 303.

Among them, the data acquisition unit 301 is configured to acquire current time and historical power supply data when a preset condition for switching a charge mode of a battery is met. The historical power supply data includes power supply information of the terminal loaded with a battery in a time period determined according to the current time. For the corresponding working process, reference may be made to the step S101 in the above-mentioned method embodiment.

The mode prediction unit 302 is configured to determine a corresponding predicted charge mode according to the historical power supply data. For the corresponding working process, reference may be made to the step S102 in the above-mentioned method embodiment.

The mode update unit 303 is configured to update a current charge mode of the terminal according to the predicted charge mode. For the corresponding working process, reference may be made to the step S103 in the above-mentioned method embodiment.

Optionally, the mode updating unit 303 may also be configured to set the current charge mode of the terminal according to a designated battery charge mode of a battery charge mode instruction, when the battery charge mode instruction is received. For the corresponding working process, reference may be made to the step S106 in the above-mentioned method embodiment.

In addition, the mode prediction unit 302 may also be configured to determine whether the data amount of the historical power supply data is greater than or equal to a preset data amount threshold. For the corresponding working process, reference may be made to the step S104 in the above-mentioned method embodiment. When the data amount of the historical power supply data is smaller than the preset data amount threshold, the mode update unit 303 may also be configured to update the current charge mode of the terminal according to the preset default charge mode. For the corresponding working process, reference may be made to the step S105 in the above-mentioned method embodiment.

Figure 4:
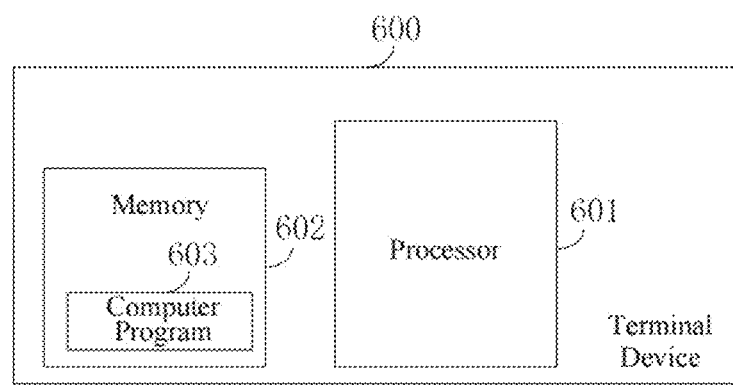
FIG. 4 is a schematic structural diagram of another specific example of a terminal device in accordance with an embodiment of the present application.

FIG. 4 is a schematic diagram of a terminal device in accordance with an embodiment of the present application. As shown in FIG. 4, the terminal device 600 in this embodiment includes: a processor 601, a memory 602, and a computer program 603 stored in the memory 602 and capable of running on the processor 601, such as the program for battery charge management method. When the computer program 603 is executed by the processor 601, the steps of the method for battery charge management in the foregoing method embodiments, such as the steps 101 to 104 shown in FIG. 1, are implemented. Alternatively, when the computer program 603 is executed by the processor 601, functions of the modules/units in the foregoing device embodiments, such as the functions of the data acquisition unit 301, the mode prediction unit 302, and the mode update unit 303 shown in FIG. 3, are implemented.

The computer program 603 may be divided into one or more modules/units, and the one or more modules/units are stored in the memory 602 and executed by the processor 601 to implement the present application. The one or more modules/units may be a series of computer program instruction segments capable of implementing specific functions, and the instruction segments are configured to describe the execution process of the computer program 603 in the terminal device 600. For example, the computer program 603 may be divided into a synchronization module, a summary module, an acquisition module, and a return module (a module in a virtual device).

The terminal device 600 may be a computing device such as a desktop computer, a laptop, a palmtop computer, and a cloud server. The terminal device may include, but is not limited to, a processor 601 and a memory 602. Those skilled in the art can understand that FIG. 4 is only an example of the terminal device 600, and does not constitute a limitation on the terminal device 600. The terminal device may include more or less components than shown in the figures, or a combination of certain components, or different components. For example, the terminal device may also include input and output devices, network access devices, buses, and so on.

The processor 601 may be a central processing unit (CPU). The processor may also be other general-purpose processors, a digital signal processors (DSP), an application specific integrated circuit (ASIC), a field-programmable gate array (FPGA) or other programmable logic devices, a discrete gate or transistor logic device, a discrete hardware component, etc. The general-purpose processor may be a microprocessor. The processor may also be any conventional processor or the like.

The memory 602 may be an internal storage unit of the terminal device 600, such as a hard disk or a memory of the terminal device 600. The memory 602 may also be an external storage device of the terminal device 600, such as a plug-in hard disk, a smart memory card (SMC), and a secure digital (SD) card, a flash card, etc. equipped on the terminal device 600. Furthermore, the memory 602 may also include both an internal storage unit of the terminal device 600 and an external storage device. The memory 602 is configured to store the computer program and other programs and data required by the terminal device. The memory 602 may also be configured to temporarily store data that has been output or will be output.

It can be clearly understand to those skilled in the art that for convenience and conciseness of the description, the division of the above-mentioned functional units and modules is only an example. In practical applications, the above-mentioned functions can be allocated to different functional units and modules as required, that is, the internal structure of the device may be divided into different functional units or modules to complete all or part of the functions described above. The functional units and modules in the embodiments can be integrated into one processing unit, or each unit can exist alone physically, or two or more units can be integrated into one unit. The above-mentioned integrated units may be realized in the form of hardware, and may also be realized in the form of a software functional unit. In addition, the specific names of the functional units and modules are only for the convenience of distinguishing each other, and are not used to limit the protection scope of the present application. For the specific working process of the units and modules in the foregoing system, reference may be made to the corresponding process in the foregoing method embodiment, which will not be repeated here.

In the above-mentioned embodiments, the description of each embodiment has its own focus. For parts that are not described in detail or recorded in an embodiment, reference may be made to related descriptions of other embodiments.

It should be noted for those of ordinary skill in the art, that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solutions. Professionals and technicians can use different methods for each specific application to implement the described functions, but such implementation should not be considered as going beyond the scope of the present application.

In the embodiments provided by the present application, it should be understood that the disclosed device/terminal device and method may be implemented in other ways. For example, the device/terminal device embodiments described above are only illustrative. For example, the division of the modules or units is only a logical function division, and there may be other divisions in actual implementation, such as multiple units or components may be combined or integrated into another system, or some features can be omitted or not implemented. In addition, a coupling or a direct coupling or a communication connection as shown or discussed may be indirect coupled to through some interfaces, devices or units, or may be connected in the communication connection, and may be connected in electrical, mechanical or other forms.

The units described as separate components may or may not be physically separated, and the components displayed as units may or may not be physical units, that is, these units may be located in one place, or may be distributed on multiple network units. Some or all of the units may be selected according to actual needs to achieve the objects of the solutions of the embodiments.

In addition, the functional units in the various embodiments of the present application may be integrated into one processing unit, or each unit may exist alone physically, or two or more units may be integrated into one unit. The above-mentioned integrated unit can be implemented in the form of hardware or software functional unit.

If the integrated module/unit is implemented in the form of a software functional unit and sold or used as an independent product, those modules/units may be stored in a computer readable storage medium. Based on this understanding, the implementation of all or part of the processes in the above-mentioned method embodiments of the present application can also be completed through an execution of computer programs by relevant hardware. The computer program can be stored in a computer-readable storage medium. When the program is executed by the processor, the steps of the foregoing method embodiments can be implemented. In which, the computer program includes computer program code, and the computer program code may be in the form of source code, object code, executable file, or some intermediate forms. The computer-readable medium may include any entity or device capable of carrying the computer program code, recording medium, U disk, mobile hard disk, magnetic disk, optical disk, computer memory, read-only memory (ROM), random access memory (RAM), electrical carrier signal, telecommunications signal, and software distribution media, etc. It should be noted that the content contained in the computer-readable medium can be appropriately added or deleted according to the requirements of the legislation and patent practice in the jurisdiction. For example, in some jurisdictions, according to the legislation and patent practice, the computer-readable medium does not include electrical carrier signals and telecommunication signals.

The above-mentioned embodiments are only used for illustration of the technical solutions of the present application, rather than limitation. Although the present application has been described in detail with reference to the foregoing embodiments, it should be understood to those of ordinary skill in the art that the technical solutions recorded in the examples may be modified, or some of the technical features may be equivalently replaced; and these modifications or replacements do not cause the essence of the corresponding technical solutions to deviate from the spirit and scope of the technical solutions of the embodiments of the present application, and should be included within the protection scope of the present application.

What is claimed is:

1. A method for battery charge management, comprising:
    acquiring at a preset time interval current time and historical power supply data corresponding to the current time when a preset condition for switching a charge mode of a battery is met, wherein the historical power supply data comprises actual power supply information of a terminal loaded with the battery within a time period determined according to a battery endurance time of the terminal and the current time;
    determining a corresponding predicted charge mode according to the historical power supply data, wherein the predicted charge mode comprises a first charge model and a second charge model; a fully-charged capacity of the first charge model is smaller than a fully-charged capacity of the second charge model, and a recharged capacity of the first charge model is smaller than a recharged capacity of the second charge model; and
    updating a current charge mode of the terminal according to the predicted charge mode,
    wherein after the current time and the historical power supply data are acquired, and before the corresponding predicted charge mode is determined according to the historical power supply data, the method for battery charge management further comprises:
    judging whether a data amount of the historical power supply data is greater than or equal to a preset data amount threshold; and
    determining the corresponding predicted charge mode according to the historical power supply data when the data amount of the historical power supply data is greater than or equal to the preset data amount threshold.

2. The method for battery charge management according to claim 1, wherein said acquiring the current time and the historical power supply data corresponding to the current time comprises:
    acquiring the current time, and determining the time period according to the battery endurance time of the terminal and the current time; and
    collecting and counting the number of times the terminal is powered in a first power supply type during the time period, and the number of times the terminal is powered in a second power supply type during the time period.

3. The method for battery charge management according to claim 2, wherein said determining the corresponding predicted charge mode according to the historical power supply data comprises:
    determining that the first charge model is the corresponding predicted charge mode, when the number of times of the first power supply type is greater than the number of times of the second power supply type in the historical power supply data.

4. The method for battery charge management according to claim 3, wherein said determining the corresponding predicted charge mode according to the historical power supply data further comprises:
    determining that the second charge model is the corresponding predicted charge mode, when the number of times of the first power supply type is smaller than or equal to the number of times of the second power supply type in the historical power supply data.

5. The method for battery charge management according to claim 1, further comprising:
    updating the current charge mode of the terminal according to a preset default charge mode when the data amount of the historical power supply data is smaller than the preset data amount threshold.

6. The method for battery charge management according to claim 1, wherein before the current time and the historical power supply data corresponding to the current time are acquired, the method for battery charge management further comprises:
    setting a current charge mode of the terminal according to a designated charge mode in a battery charge mode instruction, when the battery charge mode instruction is received.

7. A terminal device, comprising a memory, a processor, and a computer program stored in the memory and running on the processor, wherein the computer program, when being executed by the processor, causes the processor to perform operations that comprise:
    acquiring at a preset time interval current time and historical power supply data corresponding to the current time when a preset condition for switching a charge mode of a battery is met, wherein the historical power supply data comprises actual power supply information of a terminal loaded with the battery within a time period determined according to a battery endurance time of the terminal and the current time;
    determining a corresponding predicted charge mode according to the historical power supply data, wherein the predicted charge mode comprises a first charge model and a second charge model; a fully-charged capacity of the first charge model is smaller than a fully-charged capacity of the second charge model, and a recharged capacity of the first charge model is smaller than a recharged capacity of the second charge model; and
    updating a current charge mode of the terminal according to the predicted charge mode,
    wherein after the current time and the historical power supply data are acquired, and before the corresponding predicted charge mode is determined according to the historical power supply data, the operations further comprise:
    judging whether a data amount of the historical power supply data is greater than or equal to a preset data amount threshold; and
    determining the corresponding predicted charge mode according to the historical power supply data when the data amount of the historical power supply data is greater than or equal to the preset data amount threshold.

8. The terminal device according to claim 7, wherein said acquiring the current time and the historical power supply data corresponding to the current time comprises:
  acquiring the current time, and determining the time period according to the battery endurance time of the terminal and the current time; and
  collecting and counting the number of times the terminal is powered in a first power supply type during the time period, and the number of times the terminal is powered in a second power supply type during the time period.

9. The terminal device according to claim 8, wherein said determining the corresponding predicted charge mode according to the historical power supply data comprises:
  determining that the first charge model is the corresponding predicted charge mode, when the number of times of the first power supply type is greater than the number of times of the second power supply type in the historical power supply data.

10. The terminal device according to claim 9, wherein said determining the corresponding predicted charge mode according to the historical power supply data further comprises:
  determining that the second charge model is the corresponding predicted charge mode, when the number of times of the first power supply type is smaller than or equal to the number of times of the second power supply type in the historical power supply data.

11. The terminal device according to claim 7, wherein the operations further comprise:
  updating the current charge mode of the terminal according to a preset default charge mode when the data amount of the historical power supply data is smaller than the preset data amount threshold.

12. The terminal device according to claim 7, wherein before the current time corresponding to the current time and the historical power supply data are acquired, the operations further comprise:
  setting a current charge mode of the terminal according to a designated charge mode in a battery charge mode instruction, when the battery charge mode instruction is received.

13. A non-transitory computer-readable storage medium storing a computer program, wherein the computer program, when being executed by a processor, causes the processor to perform operations that comprise:
  acquiring at a preset time interval current time and historical power supply data corresponding to the current time when a preset condition for switching a charge mode of a battery is met, wherein the historical power supply data comprises actual power supply information of a terminal loaded with the battery within a time period determined according to a battery endurance time of the terminal and the current time;
  determining a corresponding predicted charge mode according to the historical power supply data, wherein the predicted charge mode comprises a first charge model and a second charge model; a fully-charged capacity of the first charge model is smaller than a fully-charged capacity of the second charge model, and a recharged capacity of the first charge model is smaller than a recharged capacity of the second charge model; and
  updating a current charge mode of the terminal according to the predicted charge mode,
  wherein after the current time and the historical power supply data are acquired, and before the corresponding predicted charge mode is determined according to the historical power supply data, the operations further comprise:
  judging whether a data amount of the historical power supply data is greater than or equal to a preset data amount threshold; and
  determining the corresponding predicted charge mode according to the historical power supply data when the data amount of the historical power supply data is greater than or equal to the preset data amount threshold.

* * * * *